(12) United States Patent
Dhansri et al.

(10) Patent No.: US 11,216,748 B2
(45) Date of Patent: Jan. 4, 2022

(54) PREDICTIVE CONTROL TECHNIQUES FOR GROUND VEHICLES

(71) Applicant: Traxen Inc., Plymouth, MI (US)

(72) Inventors: Naren Reddy Dhansri, Plymouth, MI (US); Nabil H K Hirzallah, Plymouth, MI (US); Michael Makowski, Plymouth, MI (US); Mahmood Karimi, Plymouth, MI (US); Gerti Tuzi, Plymouth, MI (US); Syed Ali, Plymouth, MI (US); Saeed Zamanzad Gavidel, Plymouth, MI (US); Ali Maleki, Canton, MI (US)

(73) Assignee: Traxen, Inc., Plymouth, MI (US)

( * ) Notice: Subject to any disclaimer, the term of this patent is extended or adjusted under 35 U.S.C. 154(b) by 185 days.

(21) Appl. No.: 16/438,319

(22) Filed: Jun. 11, 2019

(65) Prior Publication Data

US 2019/0378041 A1   Dec. 12, 2019

Related U.S. Application Data

(63) Continuation of application No. 16/355,657, filed on Mar. 15, 2019, now Pat. No. 11,107,002, which is a continuation of application No. 16/355,641, filed on Mar. 15, 2019, now Pat. No. 11,072,329, which is a continuation of application No. 16/289,635, filed on Feb. 28, 2019, now abandoned, which is a continuation of application No. 16/289,638, filed on Feb. 28, 2019, now abandoned, which is a continuation of application No. 16/212,108, filed on Dec. 6, 2018.

(60) Provisional application No. 62/683,188, filed on Jun. 11, 2018.

(51) Int. Cl.
| | |
|---|---|
| *G06N 20/00* | (2019.01) |
| *B60W 50/00* | (2006.01) |
| *B60W 30/14* | (2006.01) |
| *G06N 7/00* | (2006.01) |

(52) U.S. Cl.
CPC ............. *G06N 20/00* (2019.01); *B60W 30/14* (2013.01); *B60W 50/0097* (2013.01); *B60W 2050/0013* (2013.01); *B60W 2400/00* (2013.01)

(58) Field of Classification Search
USPC ......................................................... 701/98
See application file for complete search history.

(56) References Cited

U.S. PATENT DOCUMENTS

| | | | |
|---|---|---|---|
| 9,020,726 B2 | 4/2015 | Boeckenhoff et al. | |
| 2012/0010767 A1* | 1/2012 | Phillips ................. | B60W 10/06 701/22 |
| 2016/0167582 A1* | 6/2016 | Chen ..................... | G01C 21/32 348/148 |
| 2018/0072157 A1 | 3/2018 | Koebler et al. | |

(Continued)

FOREIGN PATENT DOCUMENTS

DE        102016214045         2/2018

*Primary Examiner* — Tyler D Paige

(57) ABSTRACT

A ground vehicle control system including a plurality of sensors and one or more predictive controllers. The sensors can be configured to detect environment information and vehicle operating information. The one or more predictive controllers can be configured to self-train for an energy consumption solution based on one or more control parameters including the environment information and the vehicle operating information.

26 Claims, 9 Drawing Sheets

(56) References Cited

U.S. PATENT DOCUMENTS

2018/0089563 A1* 3/2018 Redding .............. G05D 1/0088
2019/0378041 A1* 12/2019 Dhansri ................. G06N 20/00
2020/0050209 A1* 2/2020 Bai .................... B60K 31/0058

* cited by examiner

PREDICTIVE CONTROL TECHNIQUES FOR GROUND VEHICLES

CROSS-REFERENCE TO RELATED APPLICATIONS

This is a Continuation of U.S. patent application Ser. No. 16/355,657, filed Mar. 15, 2019, a Continuation of U.S. patent application Ser. No. 16/355,641, filed Mar. 15, 2019, a Continuation of U.S. patent application Ser. No. 16/289,638 filed Feb. 28, 2019, a Continuation of U.S. patent application Ser. No. 16/289,635, filed Feb. 28, 2019, a Continuation of U.S. patent application Ser. No. 16/212,108 filed Dec. 6, 2018, and claims the benefit of U.S. Provisional Patent Application No. 62/683,188 filed Jun. 11, 2018, all of which are incorporated herein by reference in their entirety. This application also claims the benefit of co-filed U.S. application Ser. No. 16/438,337, filed Jun. 11, 2019, entitled "Pre-Training of a Reinforcement Learning Ground Vehicle Controller Using Monte Carlo Simulation", co-filed U.S. application Ser. No. 16/438,223, filed Jun. 11, 2019, entitled "Normalized Performance Comparison Techniques", co-filed U.S. application Ser. No. 16/438,305, filed Jun. 11, 2019, entitled "User Vehicle Operation Interface Systems and Methods", and co-filed PCT Application No. PCT/US19/36634, filed Jun. 11, 2019, entitled "Automated Cruise Control System to Automatically Decrease an Overall Ground Vehicle Energy Consumption", all of which are incorporated herein by reference in their entirety.

BACKGROUND OF THE INVENTION

The operating costs of commercial vehicles include fuel, labor, equipment, insurance and the like. The fuel costs are the largest portion of the operating costs. The profit margin across the commercial truck industry is currently approximately 4.8%. Therefore, if operating costs, through fuel savings, can be reduced by just 5%, the net operating profit margins for a trucking company can be increased by 50%.

Generally, optimal energy efficiency can be obtained while cruising at a steady speed, at minimal throttle and with the transmission in the highest gear on a level roadway. However, the driving environment is highly dynamic and therefore ground vehicles cannot be operated at a steady state cruising speed, with minimal throttle input in the highest gear. Hills, curves, traffic, weather and the like will require the vehicle to operate at varying speeds, accelerating and braking, and changing between multiple gears. The driving environment and the skill of the given driver can have a significant impact on energy efficiency. Different drivers will also operate ground vehicles at different speeds, have different acceleration and braking patterns, and use different gears at different times. For example, two different drivers may operate substantially identical vehicles and maneuver along identical routes during identical traffic conditions. The first driver may operate the ground vehicle differently from the second driver. The first driver may, for example, apply the brakes significantly less than the second driver by coasting toward upcoming stops, in comparison to the second driver who may continue to drive toward the stop and abruptly apply the brakes upon reaching the stop. The different driving styles of the drivers can result in different overall energy utilization for the same trips.

Conventional, cruise control and adaptive cruise control systems can provide some increases in fuel economy. The cruise control and adaptive cruise control systems allow the driver to set the speed of the ground vehicle. Adaptive cruise control systems can also automatically adjust the vehicle speed by gradually braking and accelerating such that the ground vehicle maintains a specified distance from an impeding ground vehicle while operating at the set speed as much as possible. The set speed and controlled acceleration and braking of cruise control and adaptive cruise control systems typically provides some improved fuel efficiency in comparison to manual operation by the second type of driver. However, the driving style of the first driver may provide better energy efficiency than the cruise control and adaptive cruise control systems. Therefore, there is a continuing need for further energy economy techniques.

SUMMARY OF THE INVENTION

The present technology may best be understood by referring to the following description and accompanying drawings that are used to illustrate embodiments of the present technology directed toward ground vehicle control techniques.

In one embodiment, a ground vehicle control system can include a plurality of sensors and one or more predictive controllers. The plurality of sensors can be configured to detect environment information and vehicle operating information. The one or more predictive controllers can be configured to determine an energy consumption solution based on one or more control parameters including the environment information and the vehicle operating information. The environment information can include one or more of current roadway topography, future roadway topography, traffic information, and traffic control device state, and the vehicle operating information can include one or more of fuel map and vehicle mass. The one or more predictive controllers can also be configured to generate one or more control signals based on the energy consumption solution for output in a vehicle control mode. The vehicle control modes can include an active control mode, an assist control mode, a coaching control mode, and a passive control mode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
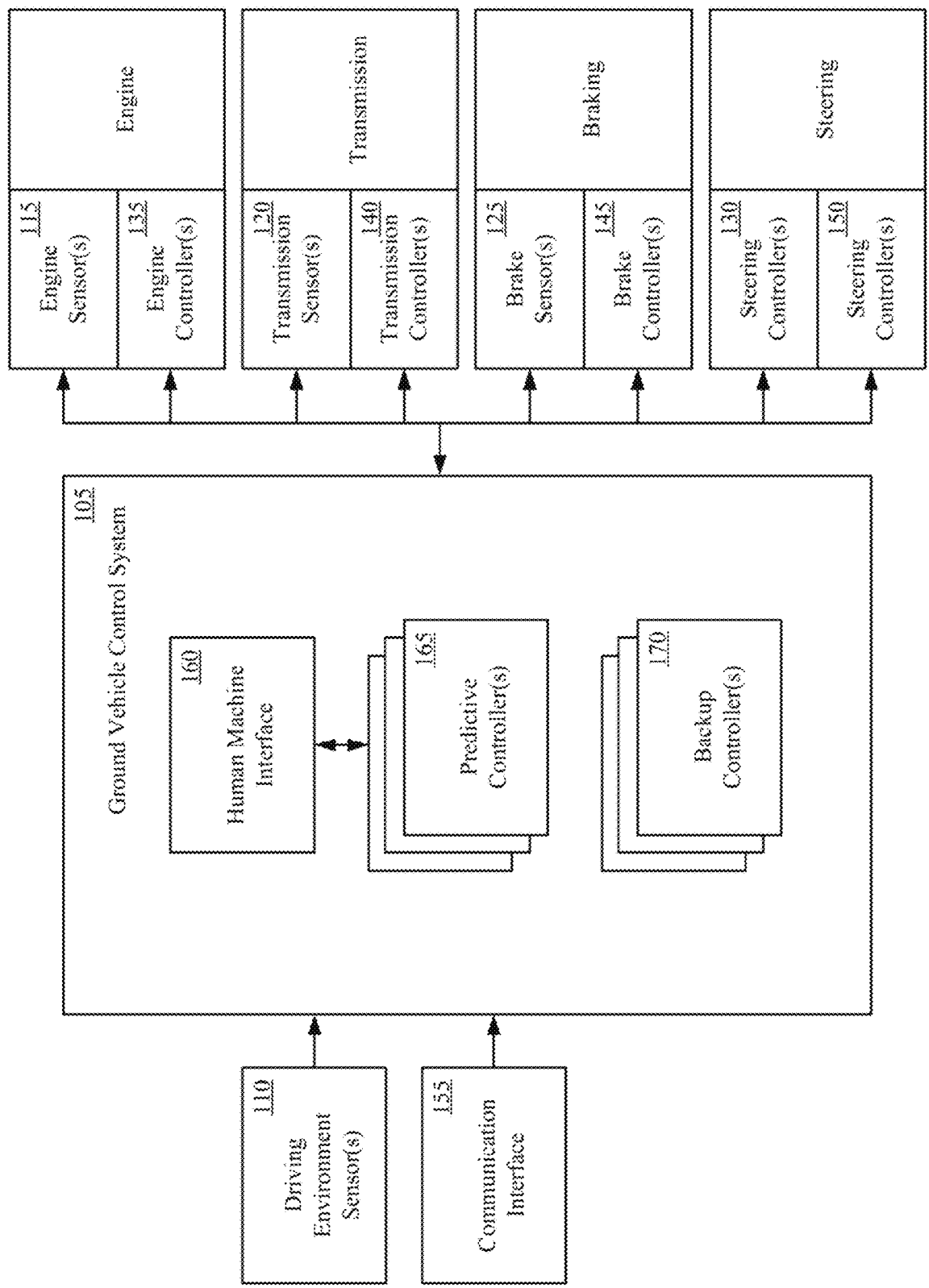
FIG. 1 shows a predictive enhanced cruise controller for use in a ground vehicle, in accordance with aspects of the present technology.
Figure 2:
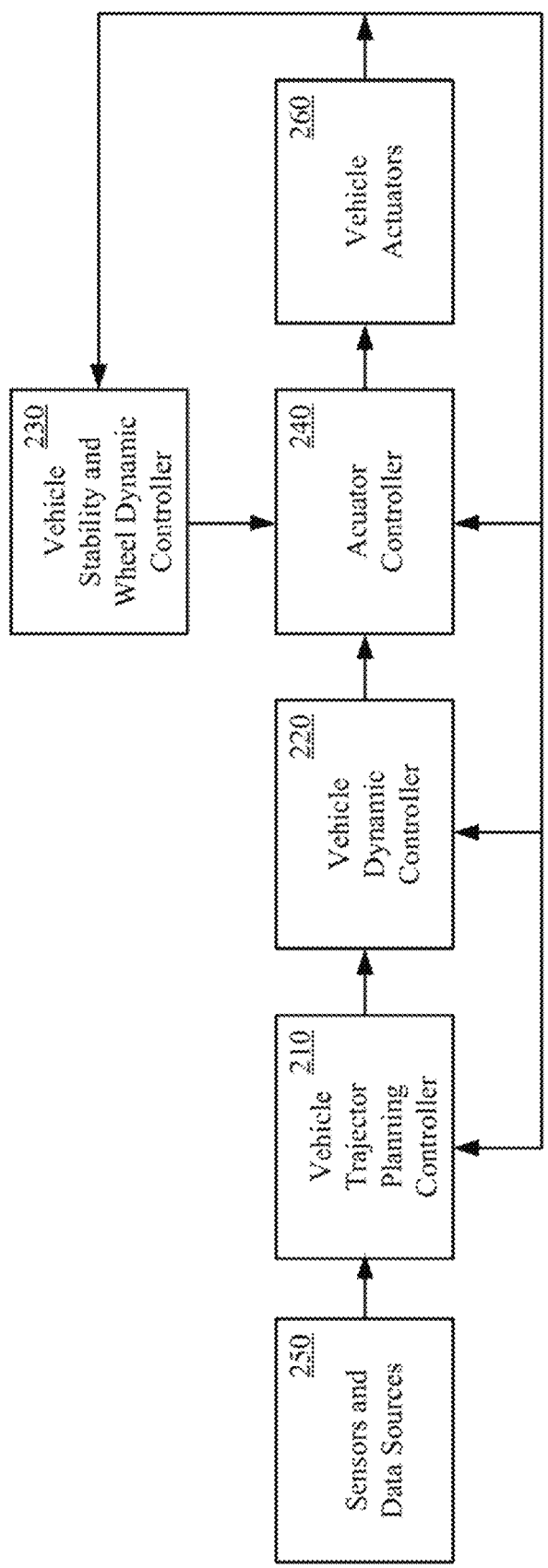
FIG. 2 shows functions performed by the one or more predictive controllers, in accordance with aspects of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

As used herein, a ground vehicle includes a motorized vehicle with wheels that maneuvers along roadways. For example, ground vehicles can include, but are not limited to, semi-trucks, tractor-trailers, trucks, busses, motorhomes, automobiles, cars, motor cycles, recreational vehicles (RVs), all-terrain vehicles (ATVs), utility vehicles (UTVs), tractors and the like. As used herein, the term energy can include, but is not limited to, gasoline, diesel, propane, natural gas, ethanol, alcohol, electricity, solar, battery, hydrogen, and the like. As used herein, engines can include, but are not limited to, internal combustion engines, electric motors, and the like. As used herein, the term powertrain includes the mechanisms by which power is generated and transmitted to the roadway by the ground vehicle. As used herein, the term performance can include, but is not limited to, energy consumption, braking, shifting, travel time, travel distance, and or the like.

Referring to FIG. 1, a ground vehicle control system, in accordance with aspects of the present technology, is shown. The ground vehicle control system 105 can be communicatively coupled to one or more driving environment sensors 110, one or more ground vehicle sensors 115-130, one or more ground vehicle controllers 135-150 and one or more communication interfaces 155 of a ground vehicle. The one or more driving environment sensors 110 can include one or more forward, side, rear view and cab cameras, one or more light detection and ranging (LIDAR) sensors, one or more radar sensors, global position systems (GPS), and or other similar sensors for detecting one or more elements of the driving environment. The one or more ground vehicle sensors can include one or more engine sensors 115, one or more transmission sensors 120, one or more brake sensors 125, one or more steering sensors 130, one or more accelerometers, one or more inertial measurement units (IMU), and or other similar sensors. The one or more ground vehicle controllers can include one or more engine controllers 135, one or more transmission controllers 140, one or more brake controllers 145, one or more steering controllers 150 and or other similar controllers. The one or more communication interfaces 155 can include one or more communication interfaces internal to the ground vehicle, such as a CANN bus interface, and or one or more external communication interfaces such as WIFI, cellular telephone, satellite network interfaces, dedicated short range communications (DSRC), and or the like.

In one implementation, the ground vehicle control system 105, and or the one or more of the sensors and controllers 115-155 can be integral to the ground vehicle. The ground vehicle control system 105 can be implemented in hardware, firmware, software or any combination thereof. In other implementations, the ground vehicle control system 105 can be implemented in a distributed computing architecture. For example, some functions of the ground vehicle control system can be implemented as computing device-executable instructions (e.g., computer program) that are stored in computing device-readable media (e.g., computer memory) and executed by a computing device (e.g., processor) on the ground vehicle. One or more other functions can be implemented on one or more other computing devices external to the ground vehicle. The one or more other functions can for example be implement in the cloud, on a remote server, or the like.

The engine sensors 115 and engine controllers 135 can include, but not limited to, Engine Control Modules (ECM), Engine Control Units (ECU), throttle position sensors, fuel injector sensors, intake sensors, mass airflow sensors, oxygen sensors, exhaust sensors, engine tachometers, voltmeters, current meters, temperature sensors, fluid level sensors, and the like. The engine sensors 115 can for example provide ground vehicle operating parameters such as current fuel consumption, engine revolutions per minute (RPMs), and the like. The engine controllers 135 can for example control fuel injection parameters in response to throttle control inputs, and the like. The transmission sensors 120 and transmission controllers 140 can include, but not limited to, shift lever position sensors, gear selection sensors, clutch pedal position sensors, Transmission Control Units (TCU), tachometers, temperature sensors, fluid level sensors, hydraulic controllers, servos, and the like. The transmission sensors 120 can for example provide vehicle operating parameters such as transmission RPM, torque, current gear, and the like. The transmission controllers 140 can for example control clutch and shift inputs and the like. The brake sensors 125 and brake controllers 145 can include, but not limited to, brake pedal position sensors, brake pedal force sensors, hydraulic pressure sensors, air pressure sensors, torque sensors, anti-lock brake system (ABS) controllers, and the like. The steering sensors 130 and steering controllers 150 can include, but not limited to, steering position sensors and the like. The driving environment sensors 110 can include, but not limited to, cameras, radar, light detection and ranging (LIDAR), temperature sensors, and the like. The driving environment sensors 110 can be used to determine driving environment parameters such as road surface conditions, road width, lane markings, traffic control devices, traffic conditions, line of sight, visibility, lighting, current weather, location, and the like. The one or more communication interfaces 155 can provide for downloading or streaming of two- or three-dimensional map data, current and future weather conditions, traffic conditions, and or the like. Some sensors and controllers can provide and or operate on the same, similar and or overlapping data, functions and the like. In addition, various data and or functions can be combined to increase confidence, increase accuracy, generate additional data, generate higher level functions, and or the like.

The ground vehicle control system 105 can receive a plurality of ground vehicle operating parameters, driver control inputs, and one or more driving environment parameters from the one or more ground vehicle sensors 115-130, one or more driving environment sensors 110, and one or more communication interfaces 155. One or more predictive controllers 165 of the ground vehicle control system 105 can be configured to self-train for determining an energy consumption optimal/sub-optimal solution based on the one or more ground vehicle operating parameters, driver control inputs, and one or more driving environment parameters. In addition or in the alternative, the one or more predictive controllers can be configured by tuning parameters manually. The one or more predictive controllers 165 can also be configured to generate one or more control signals based on the energy consumption optimal/sub-optimal solution for output to one or more ground vehicle controllers 135-150, one or more communication interfaces 155 and or one or more human-machine interfaces 160.

The one or more control signals can be configured for output in one or more ground vehicle control modes, such as an active control mode, an assist control mode, a coaching control mode, or a passive control mode. In the active control mode, the control signals can actively control one or more of a throttle input, a brake input, a gear input and a steering input of the ground vehicle. However, the driver is paying attention in case the driver needs to take control of the ground vehicle. One or more performance parameters of the ground vehicle can also be reported to a driver or another entity in the active control mode. In the active control mode, one or more parameters of the ground vehicle, the driving environment and or driver control inputs can be recorded for review or further analysis. The parameters of the ground vehicle, the driving environment and the driver control inputs can capture both the performance of the ground vehicle and the behavior of the driver.

In the assist mode, the control signals can modify one or more of the throttle input, the brake input, the gear input and the steering input form the driver. Although the driver is actively controlling the throttle, brake, gear, shifting and steering, the ground vehicle control system can modify the input from the driver to improve performance of the ground vehicle. In one example, the driver may be providing a 100% throttle input, but the ground vehicle control system may modulate the driver throttle input to provide an 80% throttle input to the engine controller to improve fuel efficiency. One or more performance parameters of the ground vehicle can also be reported to the driver or another entity in the assist mode. In the assist mode, one or more parameter of the ground vehicle, the driving environment and or driver control inputs can be also recorded for review or further analysis. Again, the parameters of the ground vehicle, the driving environment and the driver control inputs can capture both the performance of the ground vehicle and the behavior of the driver.

In the coaching mode, the ground vehicle control system is not controlling the throttle, brake, gear and steering inputs. Instead, the control signals can be output as one or more visual, audio, or haptic feedback to the driver through one or more human-machine-interface (HMI) of the ground vehicle. In the coaching mode, the driver is actively controlling the throttle input, brake input, steering input and optionally the gear input for manual transmissions and the ground vehicle control system is providing throttle, brake, gear, shift and steering suggestions to improve performance to the driver. One or more performance parameters of the ground vehicle can also be reported to the driver or another entity in the coaching mode. For example, the driver may be providing a 100% throttle input which is input to the engine controller. However, the ground vehicle control system may provide a recommendation to the driver to decrease the throttle input to 80% to improve fuel efficiency. In the coaching mode, one or more parameter of the ground vehicle, the driving environment and or driver control inputs can be also recorded for review or further analysis. Again, the parameters of the ground vehicle, the driving environment and the driver control inputs can capture both the performance of the ground vehicle and the behavior of the driver.

In the passive mode, the driver is actively controlling the throttle input, brake input, steering input and optionally the gear input for manual transmissions. The ground vehicle control system is not controlling or providing suggestions concerning throttle, brake, gear, shift and steering inputs to the driver. In the passive mode, one or more parameter of the ground vehicle, the driving environment and or driver control inputs can be recorded for review or further analysis. Again, the parameters of the ground vehicle, the driving environment and the driver control inputs can capture both the performance of the ground vehicle and the behavior of the driver.

The one or more predictive controllers 165 can be configured to control one or more of vehicle torque, vehicle gear, vehicle retardation, vehicle speed, vehicle acceleration, vehicle fuel consumption and or the like to reduce fuel consumption. The one or more predictive controllers 165 can be configured to optimize energy consumption based on a cost function for one or more decision variables that can include engine torque, axle torque, retardation torque, vehicle speed, distance traveled and or the like, subject to the vehicle dynamics for a prediction horizon, and one or more soft and hard constraints, that can be time varying and or non-time varying.

In one implementation, the predictive controller can be configured to solve the following optimization problem using a mathematical model of longitudinal vehicle dynamics and a model predictive control technique to achieve energy optimization:

$$\text{minimize } J = \sum_{k=1}^{N_p} Q_e(k)\dot{e}(k) + \sum_{k=1}^{N_p} Q_d(k)(d_{ref}(k) - d(k))^2 + \quad (1)$$

$$\sum_{k=1}^{N_p} Q_v(k)(v_{ref}(k) - v(k)2 + k = 1NpQa(k)a(k)2 + k =$$

$$1NpQj(k)j(k)2 + k = 1NcQte(k)Terefk - Te(k)2 + k =$$

$$1NcQta(k)Tarefk - Ta(k)2 + k = 1NcQterate(k)$$

$$Teratek2 + k = 1NcQtarate(k)Taratek2$$

subject to $$d(k) + T_{gap}v(k) \le d_{lead}(k) - d_{r_{min}}(k) \quad (2)$$

$$v_{min}(k) \le v(k) \le v_{max}(k) \quad (3)$$

$$a_{min}(k) \le a(k) \le a_{max}(k) \quad (4)$$

$$T_{e_{min}}(v(k), r_g) \le T_e(k) \le T_{e_{max}}(v(k), r_g) \quad (5)$$

$$T_{a_{min}}(k) \le T_a(k) \le T_{a_{max}}(k) \quad (6)$$

$$\begin{bmatrix} \dot{d} \\ \dot{v} \\ \dot{a} \\ \dot{T}_e \\ \dot{T}_a \\ a \end{bmatrix} = \begin{bmatrix} v \\ a \\ j \\ T_{erate} \\ T_{arate} \\ -k_1 v - k_2 v^2 - k_3 + g\sin\theta + k_4 r_g T_e + k_5 T_a \end{bmatrix} \quad (7)$$

where, $$\dot{e} = c_0 + c_1 T_e + c_2 r_g v + c_3 r_g T_e v + c_4 T_e^2 + c_5 r_g^2 v^2 + c_6 r_g^2 T_e^2 v^2 \quad (8)$$

$$T_{e_{max}} = b_{11} + b_{21} r_g v + b_{31} r_g^2 v^2 + b_{41} r_g^3 v^3 \quad (9)$$

$$T_{e_{min}} = b_{12} + b_{22} r_g v + b_{32} r_g^2 v^2 + b_{42} r_g^3 v^3 \quad (10)$$

The fourth equation of (7) was derived based on the mathematical model of the vehicle longitudinal dynamics:

$$ma = -\frac{1}{2}\rho C_d A(v - v_w)|v - v_w| + \frac{1}{r_w}(r_d r_g(\alpha)\eta(\alpha)T_e + T_a - I_w \dot{\omega}_w) - \quad (11)$$

$$mg(\mu_0 + \mu_1 v + \mu_2 v 2\cos\theta + mg\sin\theta$$

Presence of a leading vehicle affects the following vehicle state. The relative spacing to the leading vehicle can be represented as follows:

$$d_r = d_{lead} - d \quad (12)$$

Where, the lead vehicle states can be found using $$\begin{bmatrix} \dot{d}_{lead} \\ \dot{v}_{lead} \\ \dot{a}_{lead} \end{bmatrix} = \begin{bmatrix} 0 & 1 & 0 \\ 0 & 0 & 1 \\ 0 & 0 & -\frac{1}{T_{lead}} \end{bmatrix} \begin{bmatrix} d_{lead} \\ v_{lead} \\ a_{lead} \end{bmatrix} \quad (13)$$

Where A is the maximum vehicle cross section area, a is the vehicle acceleration in longitudinal direction, $a_{lead}$ is a lead vehicle acceleration, $C_d$ is the aerodynamic drag coefficient, d is the distance travelled along the longitudinal direction, $d_{lead}$ is the distance travelled by the lead vehicle along the longitudinal direction, $d_{r_{min}}$ is the minimum allowed relative distance between the leading vehicle and following vehicle, $d_{ref}$ is the reference vehicle longitudinal distance travelled, é is the energy spent per unit time to move the vehicle, g=9.81 m/s$_2$ is the acceleration due to gravity, $I_w$ is the total rotational inertia of all the wheels, j is the vehicle jerk in longitudinal direction, k is the prediction horizon step, m is the combined vehicle mass (includes the mass of tractor, trailer and all other attached components), $N_p$ is the number of steps in the prediction horizon, $N_c$ is the number of steps in control horizon, Q's are the cost function weight, $r_d$ is the drive ratio, includes all the additional gearing and excludes gear ratios from gear box, $r_g(\alpha)$ is the gear box gear ration in gear α, $r_w$ is the wheel radius, $T_a$ and $T_e$ is the total torque produced at the wheels by all the actuators that reside after and before the gearbox respectively in vehicle transmission, $T_{a_{ref}}$ and $T_{e_{ref}}$ are the reference axle torque and the reference torque, for example driver desired torque, $T_{a_{max}}$, $T_{a_{min}}$, and $T_{e_{max}}$, $T_{min}$ are the maximum and minimum torques of the respective actuators. $T_{arate}$ and $T_{erate}$ are rate of changes of respective torque, $T_{gap}$ is the time gap to the leading vehicle, $T_{lead}$ is the leading vehicle acceleration or deceleration time constant, v is the vehicle velocity in longitudinal direction, $v_{lead}$ is the leading vehicle velocity, $v_{max}$ and $v_{min}$ are the maximum and minimum allowed vehicle speeds respectively, $v_{ref}$ is the reference vehicle longitudinal velocity, $v_w$ is the wind velocity, α is the current gear, $\mu_0$, $\mu_1$, $\mu_2$ are the static and speed dependent rolling resistance coefficients, η(α) are the driveline efficiencies in gear α, $\dot{\omega}_w$ is the average wheel rotational acceleration, ρ is the wind density and θ is the gradient angle. The decision variables in this optimization problem are $$x = \begin{bmatrix} d \\ v \\ a \\ j \\ \dot{T}_e \\ \dot{T}_a \\ T_e \\ T_a \end{bmatrix}, \quad (14)$$

where $\begin{bmatrix} d \\ v \\ a \\ j \end{bmatrix}$ are vehicle states and $\begin{bmatrix} \dot{T}_e \\ \dot{T}_a \\ T_e \\ T_a \end{bmatrix}$ are vehicle controls The above model predictive control problem involves solving a nonlinear optimization problem at each time step to obtain a control action. After achieving the control action sequence, the immediate control action can be applied to the vehicle, and the future control actions can be ignored. This process is repeated at each control step. If general purpose optimization solvers are used for solving this model predictive control problem, they could be very slow, thereby imposing a serious restriction to implement it on real time embedded or rapid prototyping platforms. A custom solver can be implemented for this purpose which can be tailored to this application that significantly reduces the computational speed. In one implementation, a nonlinear interior point line search method can be used to solve the nonlinear optimization problem, where in the inequality constraints would be converted into equality constraints by using new variables called slack variables. To minimize infeasibilities and potentially to reduce the number of iterations at each control cycle, the optimization problem can be slightly relaxed to result in near optimal solutions. This can be done by converting the hard inequality constraints mentioned in (2) to (6) into soft inequality constraints by utilizing softening variables. The new optimization problem can be formulated as:

$$\min f_1(x) + f_2(e)$$

subject to $$g_i(x) = 0, i = 1, 2, \ldots, m$$

$$r_i(x) + w_i e_i - s_i = 0, i = 1, 2, \ldots, q$$

$$s_i \geq 0, i = 1, 2, \ldots, q \quad (15)$$

Where x are the decision variables which are vehicle states and controls as mentioned in (14), $s_i$ are slack variables and $e_i$ are the softening variables. $f_1(x)$ is a cost function designed for a fuel-efficient adaptive cruise control, as mentioned in (1); $g_i(x)$ represents the vehicle dynamics equations for the entire prediction horizon from (7); $r_i(x)$ represent time-varying inequality constraints from (2) to (6) for the entire prediction horizon. $f_2(e)$ can be written as $$f_2(e) = \sum_{i=1}^{N_i} \sum_{k=1}^{N_p} Q_{e_i}(k)(e_i(k))^2 \quad (16)$$

Where $N_i$ represents the number of inequality constraints. Interior point method requires to find solution of a series of barrier problems of the form $$\min f_1(x) + f_2(e) - \mu \sum_{j=1}^{q} \ln(s_j)$$

subject to $$g_i(x) = 0, i = 1, 2, \ldots, m$$

$$r_i(x) + w_i e_i - s_i = 0, i = 1, 2, \ldots, q \quad (17)$$

The solution of the above problem can involve formulating the following Lagrangian function:

$$L(x,e,s,\lambda,z) = f_1(x) + f_2(e) - \mu \sum_{j=1}^{q} \ln(s_j) - \sum_{i=1}^{m} \lambda_i g_i(x) - \sum_{j=1}^{q} z_j(r_j(x) + w_j e_j - s_j) \quad (18)$$

Let x* be a regular point and a local minimum of the problem, if the functions are designed to be continuously differentiable, then KKT necessary conditions for optimality conditions for the barrier problem state that for a certain t, there exist unique Lagrange multipliers vectors $\lambda^*$ and $z^*$ such that $$\nabla_x L(x^*, e^*, s^*, \lambda^*, z^*) = 0 \quad (19)$$

$$\nabla_e L(x^*, e^*, s^*, \lambda^*, z^*) = 0$$

$$-\frac{\mu}{s_j^*} + z_j^* = 0, \; j = 1, 2, \ldots, q$$

$$g_i(x^*) = 0, i = 1, 2, \ldots, m$$

$$r_j(x^*) + w_j e_j^* - s_j^* = 0, j = 1, 2, \ldots, q$$

$$s_j^* \geq 0, \text{ for all } j = 1, 2, \ldots, q$$

$$z_j^* \geq 0, \text{ for all } j = 1, 2, \ldots, q$$

The above are called Karush-Kuhn-Tucker (KKT) optimality conditions for the barrier problem. Since the optimization problem is nonlinear in nature, the equations that are resulting from KKT optimality conditions are also nonlinear. The optimal solution for the barrier problem (17) can be found by iteratively linearizing the nonlinear KKT equations (19) using Taylor's series expansion and solving the simultaneous linear algebraic equations. The simultaneous algebraic are of the form:

$$\begin{bmatrix} a_{11} & 0 & 0 & a_{14} & a_{15} \\ 0 & a_{22} & 0 & a_{24} & 0 \\ 0 & 0 & a_{33} & I & 0 \\ a_{14}^T & a_{24}^T & I & 0 & 0 \\ a_{15}^T & 0 & 0 & 0 & 0 \end{bmatrix} \begin{bmatrix} dx \\ de \\ ds \\ dz \\ d\lambda \end{bmatrix} = - \begin{bmatrix} R_1 \\ R_2 \\ R_3 \\ R_4 \\ R_5 \end{bmatrix} \quad (20)$$

Where $$\begin{bmatrix} dx \\ de \\ ds \\ dz \\ d\lambda \end{bmatrix}$$

is defined as the search direction. After obtaining the search direction, the new iterates can be found using:

$$\begin{bmatrix} x \\ e \\ s \\ \lambda \end{bmatrix}_{i+1} = \begin{bmatrix} x \\ e \\ s \\ \lambda \end{bmatrix}_i + \alpha_{1_i} \begin{bmatrix} dx \\ de \\ ds \\ d\lambda \end{bmatrix}_i \text{ and } z_{i+1} = z_i + \alpha_{2_i} dz_i \quad (21)$$

Where 'i' is the iteration counter of a barrier problem. The step sizes $\alpha_{1_i}$ and $\alpha_{2_i}$ can be found by line search algorithms. After finding the optimal solution of each barrier problem

(17) by the above-mentioned method, the solution of the original optimization problem (16) can be found by iteratively reducing μ.

The optimization problem in (17) will have in $23N_p+15N_e$ number of decision variables. The presence of high number of decision variables and nonlinear nature of the problem imposes a huge computational burden. To speed up the computation, sparsity of the matrix on the left of left-hand side of equation (20) can be utilized along with some modifications to the optimization. In the first step this matrix can be reduced in size by performing some row operations and eliminating row 3 as follows:

$$ds = -a_{33}^{-1}(dz+R_3) \quad (22)$$

The reduced problem can be written as:

$$\begin{bmatrix} -Q & F \\ F^T & M \end{bmatrix} \begin{bmatrix} -dU \\ dV \end{bmatrix} = -\begin{bmatrix} W_1 \\ W_2 \end{bmatrix} \quad (23)$$

Where $$Q = \begin{bmatrix} a_{11} & 0 \\ 0 & a_{22} \end{bmatrix}, F = \begin{bmatrix} a_{14} & a_{15} \\ a_{24} & 0 \end{bmatrix}, M = \begin{bmatrix} a_{33}^{-1} & 0 \\ 0 & 0 \end{bmatrix}, \quad (24)$$

$$dU = \begin{bmatrix} dx \\ de \end{bmatrix}, dV = \begin{bmatrix} dz \\ d\lambda \end{bmatrix}, W_1 = \begin{bmatrix} R_1 \\ R_2 \end{bmatrix}, W_2 = \begin{bmatrix} a_{33}^{-1}R_3 - R_4 \\ -R_5 \end{bmatrix}$$

In one implementation, the optimization problem can be designed such that matrix Q is of block diagonal form with no zero eigen values. Then, instead of solving (23) as whole, it can be broken down into smaller parts, which can be solved separately:

$$(M+F^T Q^{-1} F)dV = -(W_2+F^T Q^{-1} W_1) \quad (25)$$

$$QdU+FdV=-W_2 \quad (26)$$

Where $$Q = \begin{bmatrix} Q_{11} & 0 & \cdots & 0 \\ 0 & Q_{22} & \cdots & 0 \\ \vdots & \vdots & \ddots & \vdots \\ 0 & 0 & \cdots & Q_{pp} \end{bmatrix} \text{ and } Q^{-1} = \begin{bmatrix} Q_{11}^{-1} & 0 & \cdots & 0 \\ 0 & Q_{22}^{-1} & \cdots & 0 \\ \vdots & \vdots & \ddots & \vdots \\ 0 & 0 & \cdots & Q_{pp}^{-1} \end{bmatrix} \quad (27)$$

This can significantly speed up the computation time.

In one implementation, the matrix $(M+F^T Q^{-1} F)$ can be designed such that it always positive definite. In this case, equation (25) can be solved by taking Cholesky factorization of this matrix. Let $$Y=(M+F^T Q^{-1} F) \quad (28)$$

In addition, if Q is block diagonal, as described above, then Y can take the form:

$$Y = \begin{bmatrix} Y_{11} & Y_{12} & 0 & \cdots & 0 & 0 \\ Y_{12}^T & Y_{22} & Y_{23} & \cdots & 0 & 0 \\ 0 & Y_{23}^T & Y_{33} & \cdots & 0 & 0 \\ \vdots & \vdots & \vdots & \ddots & \vdots & \vdots \\ 0 & 0 & 0 & \cdots & Y_{T-1,T-1} & Y_{T-1,T} \\ 0 & 0 & 0 & \cdots & Y_{T-1,T}^T & Y_{TT} \end{bmatrix} = LL^T \quad (29)$$

where $$L = \begin{bmatrix} L_{11} & 0 & 0 & \cdots & 0 & 0 \\ L_{21} & L_{22} & 0 & \cdots & 0 & 0 \\ 0 & L_{32} & L_{33} & \cdots & 0 & 0 \\ \vdots & \vdots & \vdots & \ddots & \vdots & \vdots \\ 0 & 0 & 0 & \cdots & L_{T-1,T-1} & 0 \\ 0 & 0 & 0 & \cdots & L_{T,T-1} & L_{TT} \end{bmatrix} \quad (30)$$

Let $$L^T dV = T \quad (31)$$

Then, (28) can be re-written as $$LL^T dV = LT = -(W_2+F^T Q^{-1} W_1) \quad (32)$$

The above equation can be first solved to obtain T. Next, after obtaining T, the below could be solved to obtain dV $$L^T dV = T \quad (33)$$

Solving both (32) and (33) can be very inexpensive in terms of computation time because of the block lower triangular nature of the matrix L.

In another implementation, computation time can be reduced by using a fixed iteration limit. Although this might affect optimality of the solution, the effect can be minimal since only a small part of the solution can be implemented as the actual control command and the optimization problem can be solved again at the next time step, and therefore the solution will improve over time. In another implementation, a warm start can be utilized when possible. The use of a warm start means that the solution to the previous time step should be an initial guess for the solution of the next step.

Many vehicles now a days have more than one driving mechanism and more than one retardation mechanism. For example, there are vehicles with a combination of an internal combustion engine, electric motor etc. For retardation some vehicles use a combination of regenerative brakes, service brakes, engine brakes, transmission brakes, etc. Considering all the actuators directly in predictive control problem (1) could significantly increase the complexity of problem. Specifically, if the higher-level control is based on optimization, the number of optimization variables increase significantly. In addition to this, these actuator dynamics are faster than the vehicle dynamics. This adds a requirement that the vehicle dynamic control algorithms need to be run at a faster sampling time, which results in a significantly increased computation burden. The hierarchical control architecture of the functions performed by the one or more predictive controllers 165 can reduce the computation burden and at the same time not impact the control performance. In this implementation, the torque actuators can be faster than the vehicle dynamics. Therefore, the actuator control can separate from the vehicle dynamics and a lower level controller can be designed which considers the actuator dynamics and generates desired torque signal for each individual actuator. This approach does not significantly impact the performance, while significantly reducing the computation time of optimization based higher level control algorithms.

Since different actuators have different dynamics and different operating costs, they can be associated with different priorities in different scenarios, An optimization-based control scheme naturally enables priorities to be set for different controllers. The controller performance can be improved if a constrained optimization is used because all these actuators have their own limitations (different minimum and maximum torques are supported by each actuator). A constrained-optimization based control approach enables the limitations to be considered explicitly in the control design. Control performance can be further improved by preview control. A preview control in this context enables the planning of the actuator resources by utilizing the preview information pertaining to the total desired torque from the vehicle dynamic controller/vehicle stability controller/wheel dynamic controller. The priorities, constraints and preview information can be for example derived based on location, overheating, brake pad life, high wheel/vehicle dynamics, minimizing switching between different actuators and the like, With regard to location, there can be certain locations where engine retardation is not permitted. Using GPS, camera and maps, such locations can be determined and the engine retardation mechanism can be disabled. In hilly areas excessive use of service brakes might result in overheating and increased wear on the brake pads. In these scenarios, the higher priority can be given to the other retardation mechanisms. When the service brakes are overheated, it reduces the braking performance and might reduce the brake pad life if the brakes are continued to be used. In these scenarios, lower priority could be given to the service brakes. A high wheel dynamic scenario (for example, high wheel longitudinal slip and/or side slip) could cause the vehicle to be near the limits of stability and traction. This could result in an activation of one or more controllers such as vehicle stability control, traction control, antilock-brakes etc. Vehicle stability control systems can utilize the differential braking mechanism to generate/counteract a yaw movement by manipulating brake pressures on each wheel. Wheel dynamic control systems such as anti-lock brakes and traction control improves the braking/traction/lateral forces by manipulating the wheel slips. In these scenarios, service brakes shall be used, and other forms of braking may have to be disabled. The priorities and constraints of these different actuators can hence be derived accordingly.

In one implementation, the preview control problem can be formulated by finding the desired torque from all actuators that lie before the gearbox $T_{e_{des}}$ and or the desired torque from all the actuators that lie after gearbox $T_{a_{des}}$, in accordance with Equations (34)-(40).

$$\text{minimize } J = \tag{34}$$

$$\sum_{k=1}^{N_p} Q_{te}(k)\left(T_{e_{ref}}(k) - T_e(k)\right)^2 + \sum_{k=1}^{N_p} Q_{ta}(k)\left(T_{a_{ref}}(k) - T_a(k)\right)^2 +$$

$$\sum_{i=1}^{n} \sum_{k=1}^{N_p} Q_{e_i}(k)\left(T_{e_{i_{ref}}}(k) - T_{e_{i_{des}}}(k)\right)^2 +$$

$$\sum_{i=1}^{m+p} \sum_{k=1}^{N_p} Q_{a_i}(k)\left(T_{a_{i_{ref}}}(k) - T_{a_{i_{des}}}(k)\right)^2 +$$

-continued $$\sum_{i=1}^{n} \sum_{k=1}^{N_p} Q_{erate_i}(k)\left(T_{e_{i_{des}}}(k) - T_{e_{i_{des}}}(k-1)\right)^2 +$$

$$\sum_{i=1}^{m+p} \sum_{k=1}^{N_p} Q_{arate_i}(k)\left(T_{a_{i_{des}}}(k) - Taidesk - 12\right)$$

subject to the dynamics $$T_e = T_{e_1} + T_{e_2} + \cdots T_{e_n} \tag{35}$$

$$T_a = r_d(T_{a_1} + T_{a_2} + \cdots T_{a_m}) + (T_{a_{m+1}} + T_{a_{m+2}} + \cdots T_{a_{m+p}}) \tag{36}$$

$$T_{e_i} = \frac{e^{-\tau_{ed_i}s}}{\tau_{e_i}s + 1} T_{e_{i_{des}}}, i = 1, 2, \ldots n \tag{37}$$

$$T_{a_i} = \frac{e^{-\tau_{ad_i}s}}{\tau_{a_i}s + 1} T_{a_{i_{des}}}, i = 1, 2, \ldots m + p \tag{38}$$

and subject to the constraints of $$T_{e_{i_{min}}} < T_{e_{i_{des}}} < T_{e_{i_{max}}}, i = 1, 2, \ldots n \tag{39}$$

$$T_{a_{i_{min}}} < T_{a_{i_{des}}} < T_{a_{i_{max}}}, i = 1, 2, \ldots m + p \tag{40}$$

Where k is a prediction horizon step, $T_{e_i}$ and $T_{a_i}$ are the actual torque of each individual actuator that lie before and after the gearbox respectively in a vehicle transmission, $$T_{e_{i_{des}}}$$

and $$T_{a_{i_{des}}}$$

are the desired torques from their respective actuators which are also the control signals, $$T_{e_{i_{min}}}, T_{e_{i_{max}}} \text{ and } T_{a_{i_{min}}}, T_{a_{i_{max}}}$$

are minimum and maximum torques provided by their respective actuators, $T_{e_{ref}}$ and $T_{a_{ref}}$ are total reference torque signals that can be derived from higher level optimization based vehicle dynamic controllers, such as the one presented in [0031]. $\tau_{e_i}$, $\tau_{a_i}$ refer to the time constant and $\tau_{ed_i}$, $\tau_{ad_i}$ refer to the pure time delay of the respective actuator dynamics. n is the number of torque actuators that reside before the gearbox, m is the number of torque actuators that reside after the gearbox and before the wheels and finally p is the number of torque actuators that are connected directly to the wheels. Q's are respective weights and $Q_{e_i}$, $Q_{a_i}$ are the weights that are to be set according to the desired priorities, which may be set according to the scenarios mentioned in the previous section.

Figure 3:
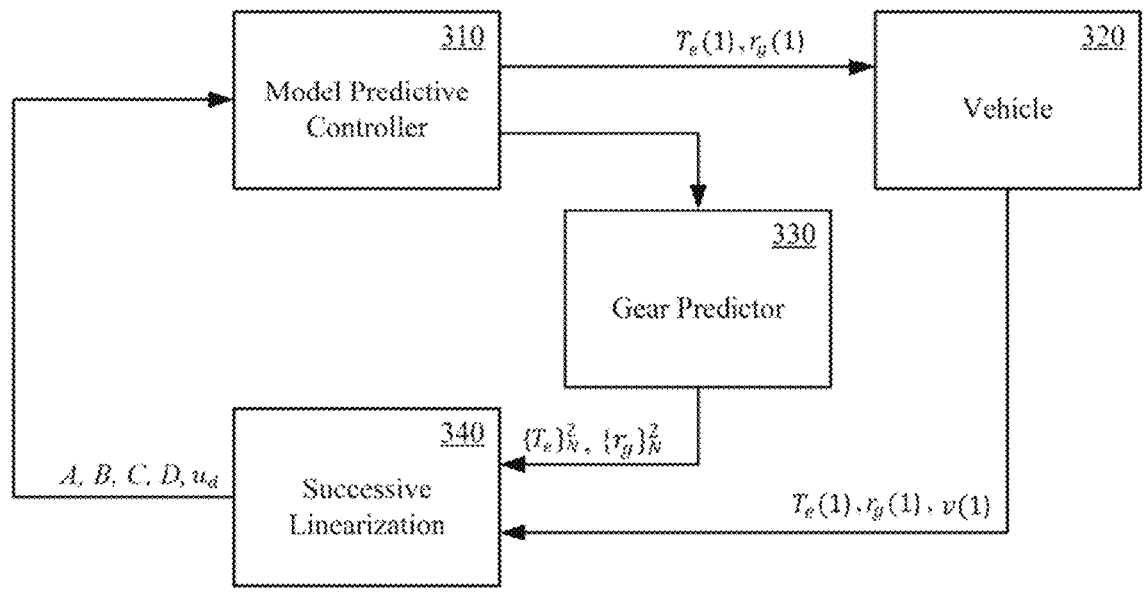
FIG. 3 shows a predictive controller utilizing linearization, in accordance with aspects of the present technology.

Referring now to FIG. 3, a predictive controller utilizing linearization, in accordance with aspects of the present technology. The predictive controller 310 can be coupled to the ground vehicle 320, a gear predictor 330 and a successive linearization module 340. The predictive controller 310 can be a Model Predictive Controller (MPC). One or more of vehicle dynamics can be subject to successive linearization. In one implementation, nonlinearities of Equations 7-10 can be subject to successive linearization at each sample time, and then Equations 1-10 can be solved using the linearized form of Equations 7-10. The first output of the optimized control sequence can be applied to the vehicle 320, while the rest of the sequence can be used for predicting a likely gear and can be used for linearization of equations 7-10 during the next control cycle. The (A, B, C, D) matrices represent the linearized dynamics and $u_d$ represents the road gradient for the next prediction horizon. The MPC can be responsible for finding the optimal Torque sequence $\{T_a\}_N^1$ where N represents the control horizon as described in Equation 2. Finding the gear ratio (which belongs to a set of discrete elements) can be found using several methods.

Figure 4:
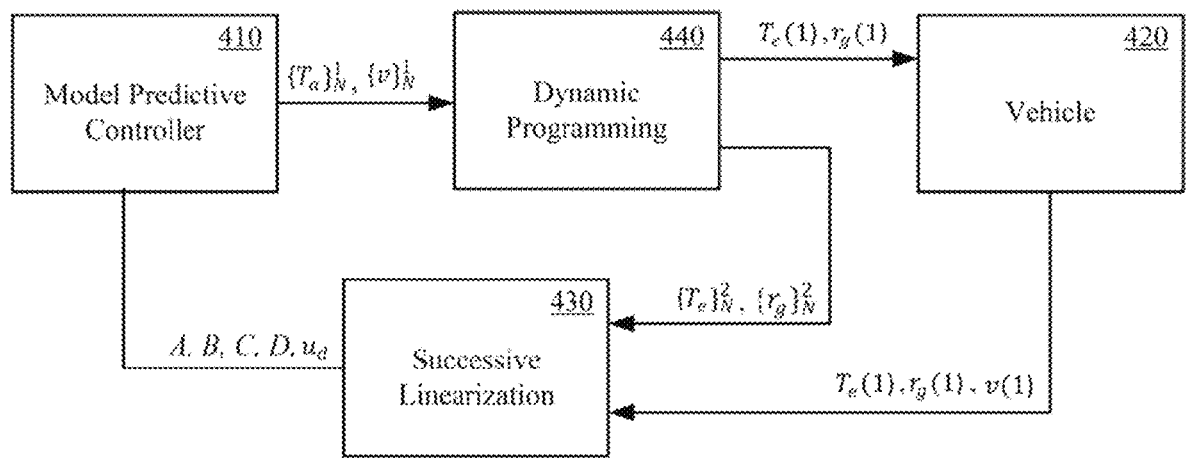
FIG. 4 shows a predictive controller utilizing linearization, in accordance with aspects of the present technology.

Referring now to FIG. 4, a predictive controller utilizing linearization, in accordance with aspects of the present technology, is shown. The predictive controller 410 can be coupled to the ground vehicle 420, a successive linearization module 430 and a dynamic programming module 440. In one implementation, the predictive controller 310 can be a model predictive controller (MPC). The MPC can be utilized to find the optimal Torque ($T_e$) and then a search algorithm such as dynamic programming can find the optimal corresponding gear ratio ($r_g$).

Figure 5:
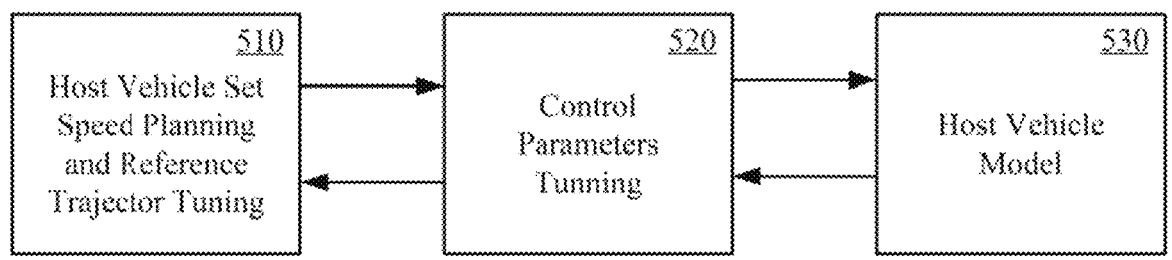
FIG. 5 shows a system for tuning weights of the vehicle control model, in accordance with aspects of the present technology.

Since the control parameters including weight factors, prediction horizons and constraint parameters can influence the closed-loop behavior, stability, robustness, safety and economic issues, development of a model predictive control parameter tuning system can be important. Also, set speed planning and tuning of the reference trajectories used to ensure a smooth transition from the current output values to the desired set point values can be important for performance as well. Referring now to FIG. 5, a system for tuning parameters of the vehicle control model, in accordance with aspects of the present technology, is shown. The system can include a reference trajectory tuning and set speed planning module 510, a tuning module for a model predictive controller 520 and a vehicle model 530. The tuning modules can be formulated as a learning, optimization or logic based problems. Reinforcement learning, Monte Carlo Simulation technique and fuzzy rule-based inference system are some ways to deal with the problem. The energy efficient driving controls can be enhanced with prior knowledge of the current route as well as detailed knowledge of route characteristics.

Figure 6:
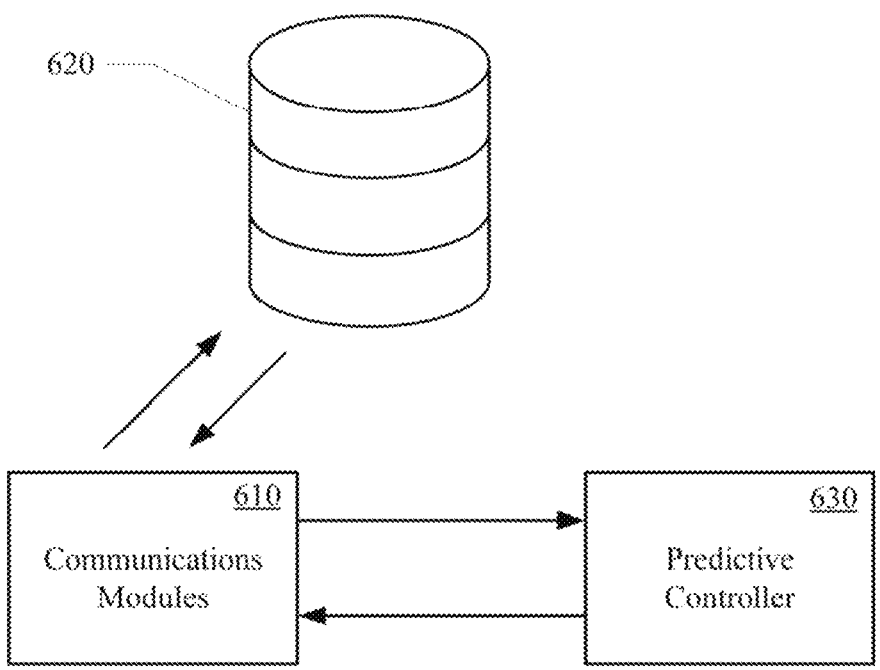
FIG. 6 shows a data communication interface, in accordance with aspects of the present technology.

Referring now to FIG. 6, a data communication interface, in accordance with aspects of the present technology, is shown. The one or more data communication interfaces 610 can be receive information from one or more data sources 620 that can be utilized by the one or more predictive controllers 630. For example, one or more current roadway topography, future roadway topography, traffic information, traffic control device status and environment information include curvature information, grade information, traffic conditions, weather, road conditions, posted speed limits can be received in real time from one or more of a cloud sources. The cloud data can be transmitted to the communications module via WIFI or cellular and then to the predictive controller over CAN using the ADASIS standard. In other instance, the information can be received from maps stored on the ground vehicle. The route information can be used to accurately optimize the behavior of the ground vehicle over the route or a portion of the route that the ground vehicle is currently on. Additionally, onboard sensors can be used to estimate the current route characteristics and update the map if there are discrepancies.

The ground vehicle control system should maintain a safe distance to one or more leading vehicles, while trying to follow a set speed. The set speed could come from the driver or from the one or higher level controllers, that may take into account one or more of safe travel speeds, map data, curvature and posted speed limits, or autonomous driving agents. The one or more predictive controllers can be configured to optimize energy consumption based on a lead vehicle model. The lead vehicle model is based on one or more of a predicted future acceleration, a velocity, and or a position of one or more lead vehicles, and a receding horizon control strategy. A lead vehicle model that captures the leading vehicle driver's or autonomous system's intent can help improve not only the speed and distance control performance, but can also improve the fuel efficiency of the ground vehicle. The lead vehicle's future acceleration, velocity and position, along with a receding horizon control strategy can be utilized to optimize the control performance and the fuel efficiency of the given ground vehicle.

In one implementation, the driving pattern of the leading vehicle can be observed using radars, cameras, LIDAR's, etc. The driving pattern along with posted speed limits, traffic information and other environment information can be used by machine learning algorithms to predict its future acceleration or speed. In one example, if the turn signal of the leading vehicle is on, the map data indicates that there is an exit and the lead vehicle is decelerating, machine learning can be used to predict the likelihood of the vehicle taking the exit and hence its probable future lead vehicle speed. This speed information can then be used to determine the lead vehicle future position. In another example, a lead vehicle might exhibit oscillatory speed behavior. This information along with traffic information that is determined using camera or other sources can be used to predict the likelihood of the lead vehicle continuing to exhibit this behavior in the future. The lead vehicle's probable future acceleration/speed can be determined accordingly. By identifying driving cycles of a lead vehicle, not only can the one or more predictive controller better predict the leading vehicle state in the future which helps with the controller performance, the one or more predictive controllers can also dynamically change the control strategy or parameters thereof to adapt to the changes of the observed driving patterns.

The ground vehicle control system 105 can further include one or more backup controllers 170. The control of the ground vehicle can switch to control by one or more backup controllers 170 when energy consumption optimization is not feasible, there is a convergence issue, in the event accurate mass or other parameters are not available or accurate, or in high deceleration events. The ground vehicle control system 150 can switch to a backup controller 170 that becomes response for providing a safe, fuel efficient cruise control, until the predictive controller can come back online. Control of the ground vehicle can switch back from the one or more backup controllers 170 when the one or more predictive controllers 165 can converge to energy consumption optimization within a prescribed iteration limit, the one or more controllers calculate a satisfactory control signal and the backup controller has been operating for a predetermined amount of time In one implementation, feedback linearization can be utilized to transform a system based on Equation 11 to a linear system. In another implementation, a disturbance observer can be utilized to compensate for the disturbances in the uncertainties in Equation 11. In yet another implementation, a Linear Quadratic (LQR) controller can be utilized for reference tracking, such as speed and relative distance, while minimizing instantaneous fuel consumption. In other implementation, a robust adaptive controller can be utilized that estimate the varying parameters and provides a corresponding stabilizing control signal that is robust to uncertainties in Equation 11. Furthermore, if robustness is critical for safe operation, the disturbance observer and the Linear Quadratic (LQR) controller can be replaced by either a robust $H_\infty$ controller, a mu-controller, a mixed objective $H_2/H_\infty$, or the like.

Figure 7A:
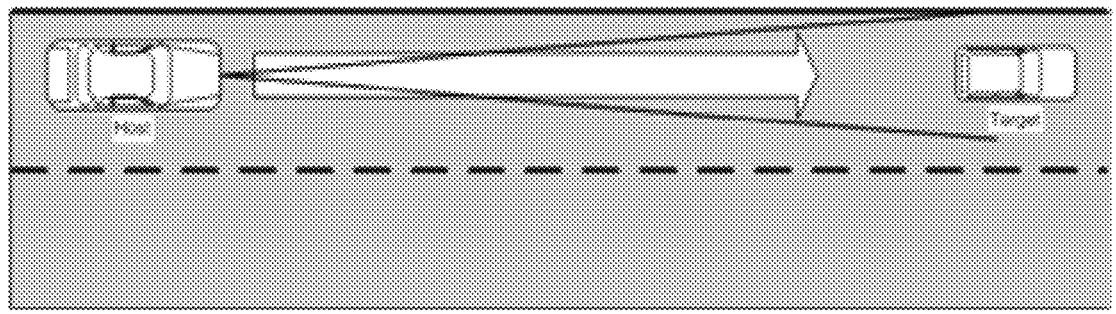
FIGS. 7A-7E illustrate various lead vehicle scenarios.
Figure 7B:
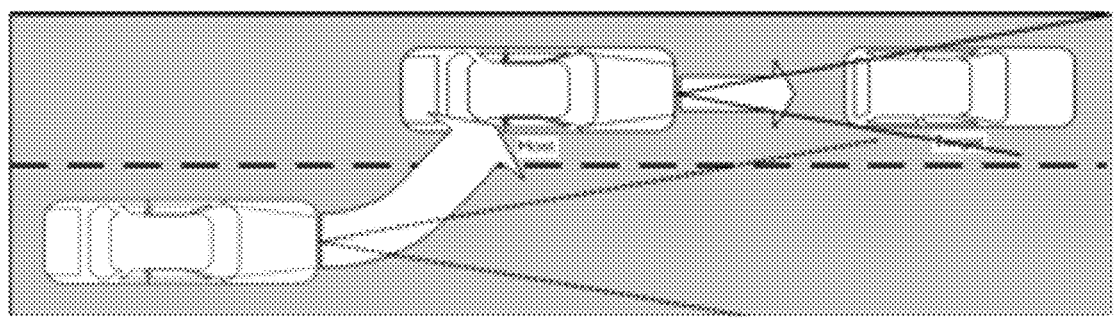
Figure 7C:
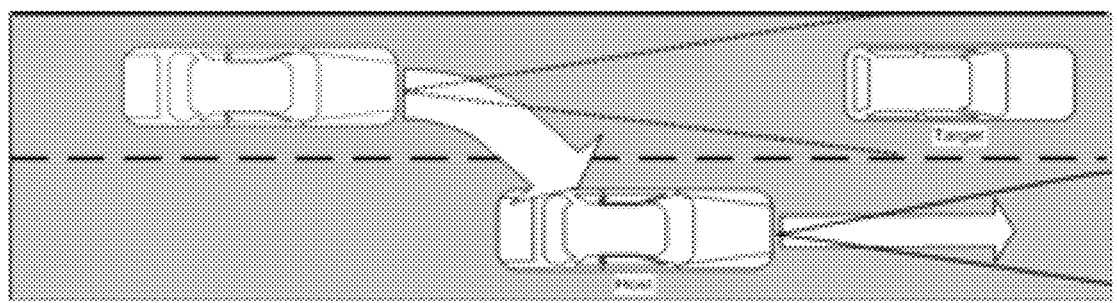
Figure 7D:
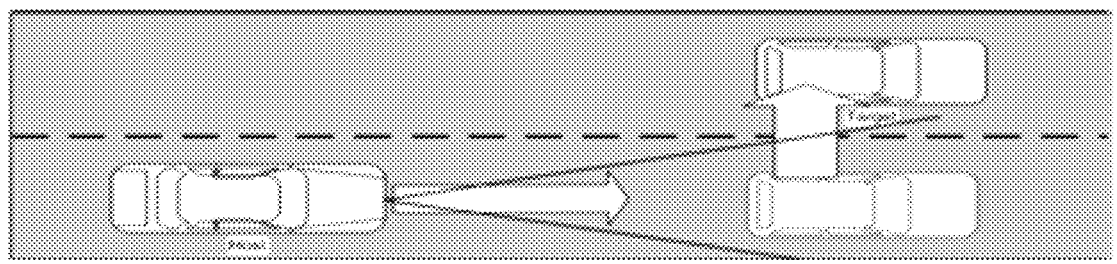
Figure 7E:
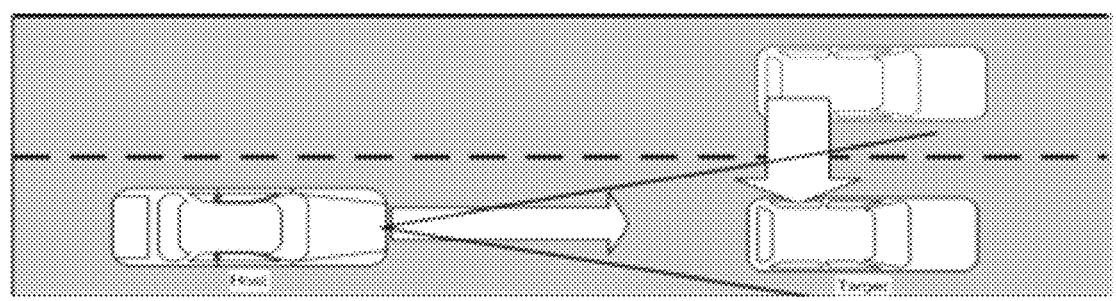

Referring again to FIG. 1, the ground vehicle control system can be configured to identify particular scenarios that the vehicle is in. The scenarios can include, but are not limited to, approaching an impeding vehicle as illustrated in FIG. 7A, the host vehicle driving in behind an impeding vehicle as illustrated in FIG. 7B, the host vehicle driving out from behind an impeding vehicle as illustrated in FIG. 7C, an impeding vehicle cutting out as illustrated in FIG. 7D, and an impeding vehicle cutting in as illustrated in FIG. 7E. The identified scenarios describe the behavior of the surrounding traffic relative to the host ground vehicle, the state of the host ground vehicle, the intention of the drivers, map data and or the like. The scenarios can be determined using information about the surrounding vehicles, such as the velocity, distance, type of vehicle brake light activation, current lane, past behavior and the like of one or more surrounding vehicles. Additionally, information can be utilized from the host vehicle, including velocity, current lane, acceleration, and mass, as well as driver input information such as steering wheel angle, brake activation, and throttle percentage, which can also be used to determine the driver's intended behavior. In one implementation, all this information can be used by machine learning classification algorithms to perform scenario classification. After classifying the scenarios appropriately, the predictive controller tuning can be adjusted online to improve energy efficiency and safety. In one implementation, the classification information can be utilized by optimization based predictive controller mentioned in equations (1) to (14) to adjust the cost function weights of equation (1) and/or relax or tighten the constraints mentioned in (2)-(6). In one example, if an impeding vehicle cuts in, is travelling faster than the host vehicle, and the relative distance is not too small, then the constraint (2) may be relaxed. This helps to reduces the necessity for the host vehicle to decelerate while also maintaining safe operating conditions. In another example, an impeding vehicle drives out that was originally travelling slower than the set speed of the host vehicle. Until the absence of another lead vehicle that is travelling slower than the host vehicle is confirmed or a certain time elapses, the weights weight $Q_v$ can be reduced and/or $Q_a$ from equation (1) can be increased to help reduce unnecessary host vehicle acceleration/decelerations. This particularly helps when there is an impeding vehicle that is travelling slower in the same lane immediately after a drive out. In both these example scenarios, scheduling the gains online based on scenario recognition not only helps reduce the energy consumption, but also improves safety, comfort, reduces the usage of brakes, etc.

The one or more controllers can include one or more predictive controllers configured to determine a target speed window based on one or more of one or more ground vehicle operating parameters and one or more driving environment parameters. The one or more predictive controllers can also be configured to determine a host vehicle performance plan based on the target speed window and one or more of the one or more ground vehicle operating parameters, the driver control inputs and the one or more driving environment parameters including the at least one predicted driving environment parameter to reduce one or more of energy consumption and vehicle retardation by a ground vehicle.

Figure 8:
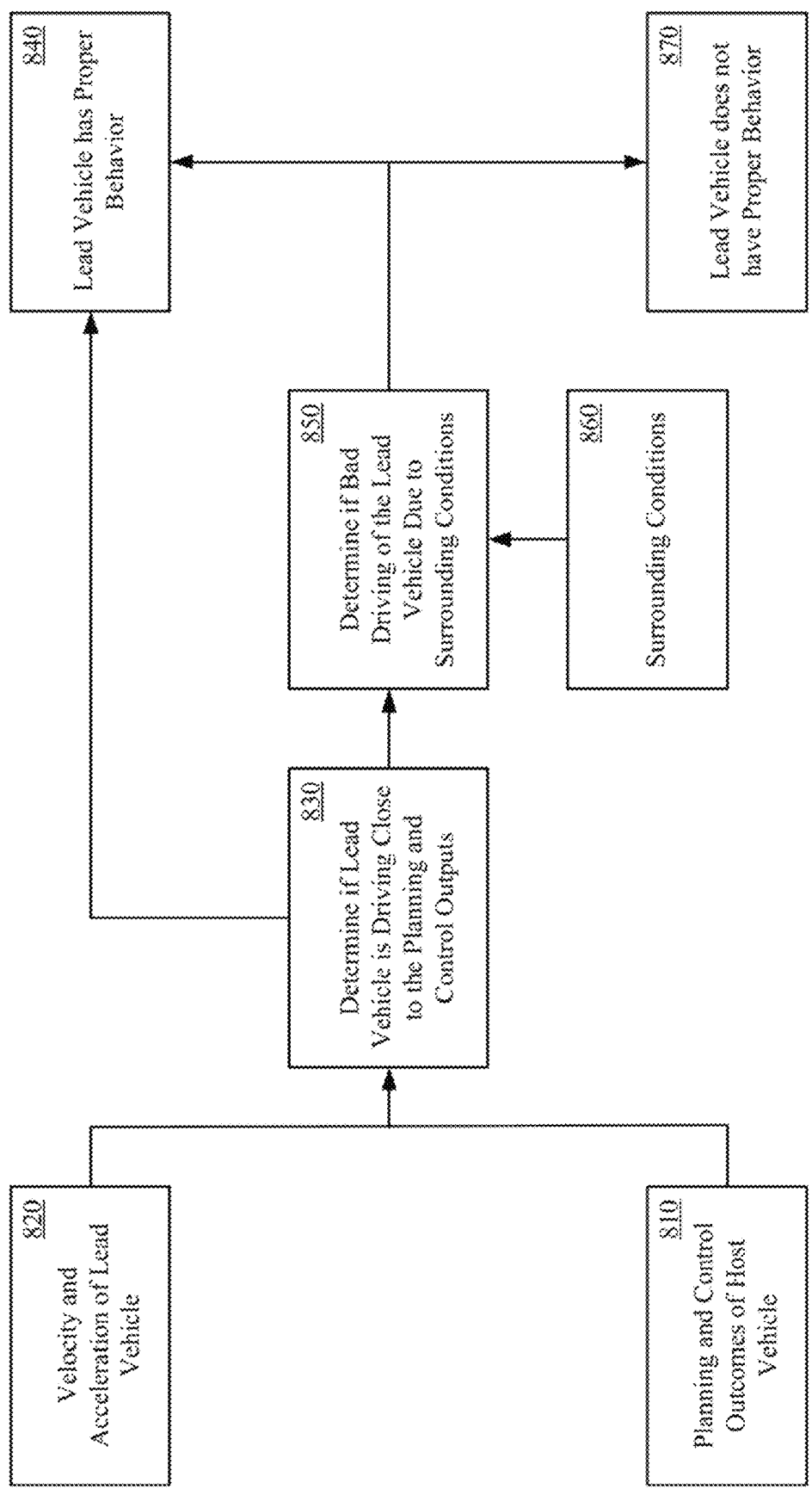
FIG. 8 shows a method of classifying behaviors of lead vehicles, in accordance with aspects of the present technology.

Referring now to FIG. 8, a method of classifying behaviors of lead vehicles, in accordance with aspects of the present technology, is shown. The one or more controllers can be further configured to compare the host vehicle performance plan 810 to the one or more driving scenarios of the one or more surrounding vehicles 820. Based on the comparison, it can be determined if the lead vehicle is driving close to the planning and control output for the host vehicle 830. If the lead vehicle is driving close to the planning and control outputs, the lead vehicle can be categorized as having proper behavior 840. If it is determined that the lead vehicle is not driving close to the planning and control outputs of the host vehicle, it can be determined if the potentially bad driving of the lead vehicle is due to surrounding conditions 850, 860. If the potentially bad driving of the lead vehicle is due to surrounding conditions, the lead vehicle can be categorized as having proper behavior 840. If the potentially bad driving of the lead vehicle is not due to surrounding conditions, the lead vehicle can be categorized as not having proper behavior 870. Accordingly, the one or more controllers can classify one or more surrounding vehicles based on differences between the host vehicle performance plan and the one or more driving scenarios of the one or more surrounding vehicles. The one or more controllers can also be configured to tune the one or more driver control inputs and the one or more ground vehicle operating parameters based on the one or more driving scenarios. The ground vehicle control system can have parameters that can be tuned to achieve a desired performance, although certain parameter values that are optimal in one scenario may not be optimal in others. One strategy can be to manually or automatically tune the parameters for each of the identified scenarios and implement the corresponding tuning once the scenario is recognized.

In comparing the host vehicle performance plan 820 to the one or more driving scenarios of the one or more surrounding vehicles 820, the one or more controllers can be configured to initially compare the acceleration/deceleration profile plan to a velocity and an acceleration of the one or more surrounding vehicles to initially determine a good or bad categorization 830, 840 for each of the one or more surrounding vehicles using machine learning. The one or more controllers can then further compare operating parameters, driver control inputs, and one or more driving environment parameters for the host vehicle to the velocity, acceleration, distance, type of vehicle signal light activation, current lane, and past behavior of the one or more surrounding vehicles to determine the good or bad categorization 830, 840 of each of the one or more surrounding vehicles. The one or more controllers can be configured to generate a suggested lane change signal for output to a driver of the host ground vehicle on one or more of the human-machine-interfaces when a bad categorization of a given one of the one or more surrounding vehicles indicates a velocity of the host ground vehicle is greater than the given surrounding vehicle or one or more inappropriate accelerations or braking events by the given surrounding vehicle. However, when one or more of the velocity, acceleration/deceleration, distance or type of vehicle signal light activation is due to heavy traffic or approaching a traffic control signal the one or more controllers can be configured to not generate the suggested lane change signal. In addition, the one or more controllers can be configured to not generate the suggested lane change signal until the bad categorization of the given surrounding vehicle persists for a predetermined period of time.

In one implementation, the information for both the lead vehicle and the host vehicle can then be compared. If the velocity and acceleration of the lead vehicle is close to the planning and control outputs of host vehicle, it can be concluded that the lead vehicle is exhibiting proper behavior. Otherwise, the behavior of the lead vehicle can be classified based on velocity and acceleration characteristics, such as low constant speed, sharp brakes, numerous speed fluctuations and the like. Next, various conditions, such as traffic, weather and the like, can be collected and combined with the classification part to make a final decision as to whether the lead vehicle is exhibiting a good behavior or not. On the other hand, there can be some input that can directly help to determine the behavior of the lead vehicle, such as activation of warning flasher on the lead vehicle.

Sometimes lane changes are inevitable, and it can result in better fuel efficiency. There can be a couple of technical reasons for changing lanes. For example, if a motion planner is used for determining set speed and it suggests a velocity for the ground vehicle that is more than the lead vehicle's velocity, a lane change is desired. In another example, a lead vehicle can exhibit inappropriate acceleration and braking cycles which can adversely affect the fuel efficiency of the host ground vehicle, even though the lead vehicle is driving at an acceptable velocity. However, if the lead vehicle is moving at a very low speed, it may be advantageous to determine the reason behind the slow speed of the lead vehicle. For example, if it is due to heavy traffic or an approaching traffic control signal, it may be beneficial to avoid a lane change. In addition, it may be advantageous for the lane change algorithm to wait for a period of time before outputting a signal for executing a lane change. The waiting period can prevent lots of possible lane changes that could have an adverse effect of fuel efficiency. In addition, it can be advantageous for the ground vehicle control system to recognize specific types of lead vehicles, such as police cars, to make a next decision.

The one or more controllers can also be tuned based on a driver state. In such case, the one or more controllers can be configured to determine a driver attention state based on or more of driver gaze information or head position information. The one or more controllers can include one or more machine learning vision controllers configured to determine one or more of the drive gaze information or the head position information. The one or more controllers can also be configured to determine a sleepy driver attention state from one or more of the driver gaze information or head position information. The one or more controllers can also be configured to determine a distracted driver attention state from one or more of the driver gaze information or the head position information. The one or more control parameters can be tuned by the one or more controllers based on the determined driver attention state. In one implementation, if we determine that the driver is inattentive, the following distance to a leading vehicle can be increased and/or the vehicle set speed can be set towards the lower end of minimum maximum speed band. The one or more controllers can be further configured to determine the driver attention state based on how much the driver complies with the one or more driver recommendation type control signals output to the driver on one or more human-machine-interfaces.

To understand how many time a driver is sleepy and for how long, visual eye recognition can be a good option. Another way to recognize a sleepy driver can be to detect head drop movement and head acceleration and/or velocity. Machine learning techniques can be used to extract sleepy state from eye recognition and or head drop recognition.

The planning of the acceleration/deceleration profile can include determining one or more traffic control devices within a prediction horizon segment from one or more of the road preview information and the environment information. A traffic control strategy can be determined based on timing information for the one or more traffic control devices within the prediction horizon.

In one implementation, the one or more predictive controllers can detect traffic control devices, such as traffic lights, in a prediction horizon and can access signal timing information. Based on the number of traffic signal in the prediction horizon, an optimization problem can be formulated to figure out what is the optimal strategy in terms of saving fuel and time. Based on the length of the prediction horizon, and depending upon the location of the traffic signal, the predictive controller can estimate an upper limit on the number of signal that can be present in the prediction horizon, and solve a permutation the optimization problem to determine the optimal scenario. For example, if there are two traffic signal present in the prediction horizon, the predictive controller can solve for the four possible scenarios to determine the optimal solution which can include: 1) accelerate to pass all signals without stopping, 2) accelerate to pass the first signal and then slow down to wait for the second signal to turn green, 3) decelerate to wait for the first signal to turn green and then accelerate to pass the second signal before it turns red, and 4) decelerate to wait for both signals to turn green. A main constraint, in such examples, can be to avoid stopping the vehicle and thereby save energy from the momentum of the ground vehicle, and also to reduce travel time.

The one or more controllers can be configured to determine a difference between driver inputs and the one or more control signals in the assist mode or coaching mode. The one or more controllers can also be optimized based on the difference between the driver inputs and the one or more control signal in the assist mode. Alternatively, the difference can be used by introducing another term in the optimization cost function or in the constraints as described above with reference to FIG. 1. Similarly, the one or more controllers can be configured to determine a rate of change in the difference between driver inputs and the one or more control signals over time in the assist control mode. The one or more controllers can also be optimized based on the rate of change in the difference between driver inputs and the one or more control signals over time in the assist mode. The difference between driver input and the one or more control signals can be used to assess the performance of the driver in coaching mode. The rate of change in the difference between driver inputs and the one or more control signals over time can provide an indication of the learning capability of the driver.

Figure 9:
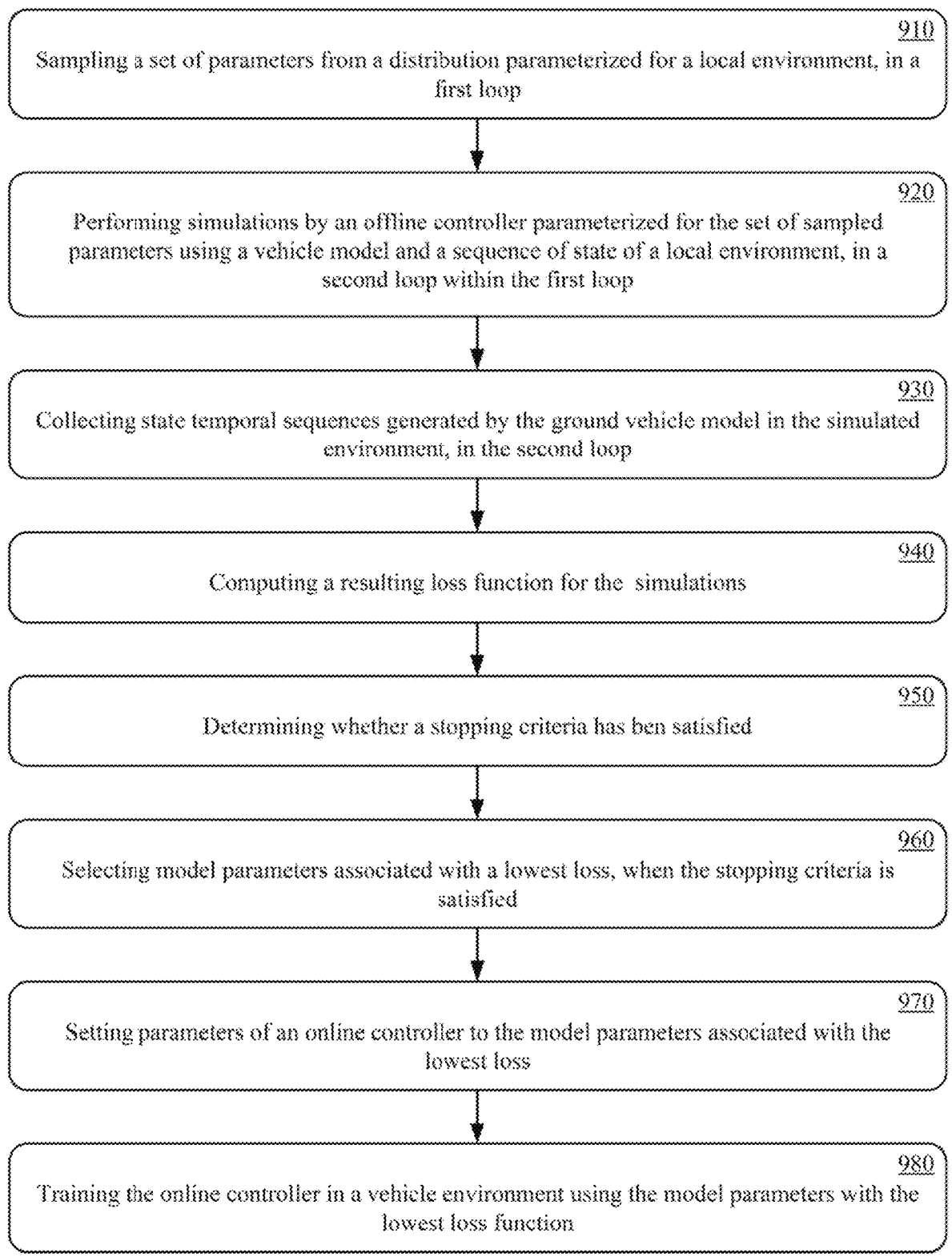
FIG. 9 shows a Monte Carlo base training of a reinforcement leaning controller, in accordance with aspects of the present technology is shown.
Figure 10:
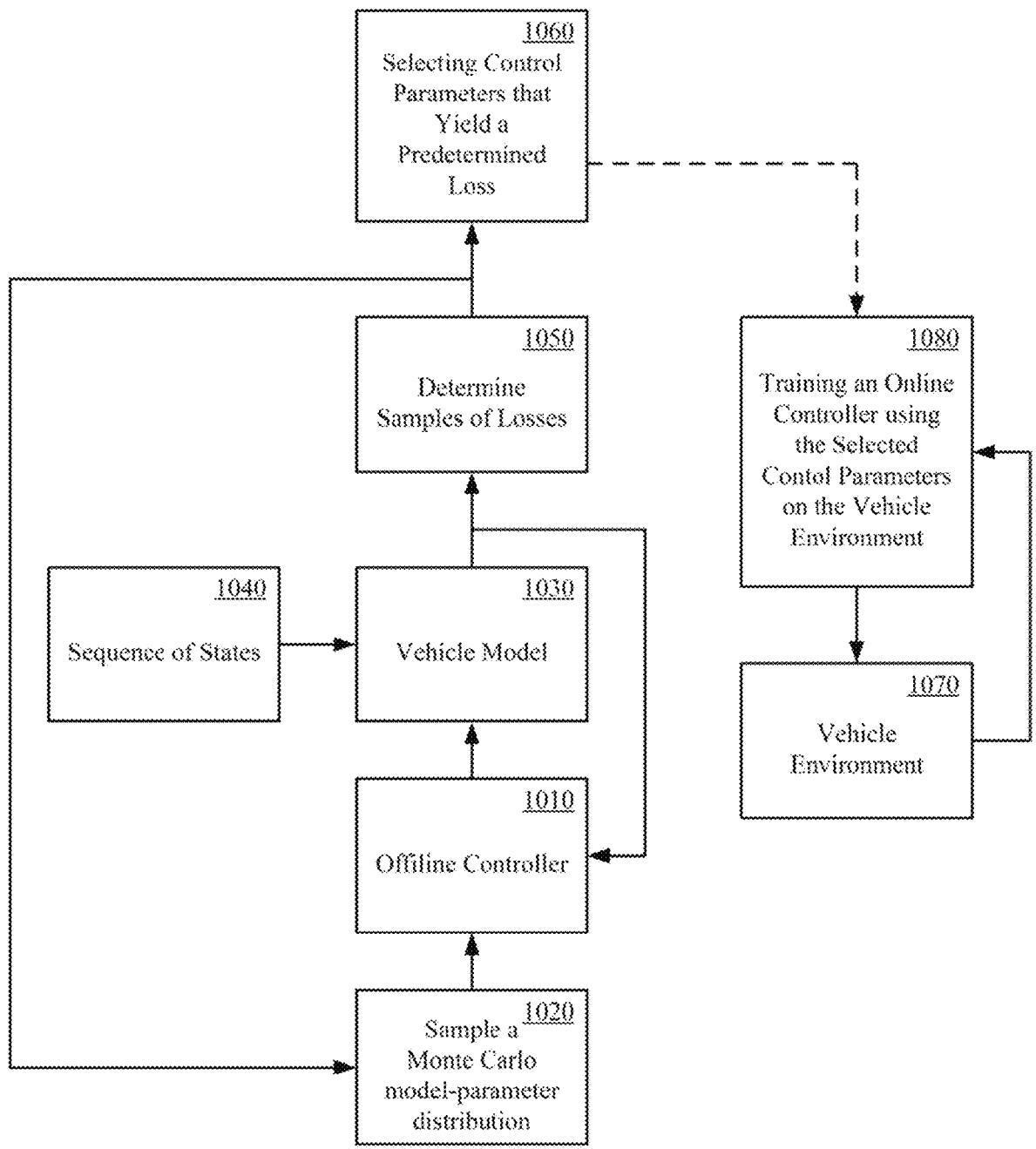
FIG. 10 shows a Monte Carlo base training of a reinforcement leaning controller, in accordance with aspects of the present technology is shown.

Referring now to FIG. 9, a Monte Carlo base training of a reinforcement leaning controller, in accordance with aspects of the present technology is shown. The method can begin with receiving a model-parameter distribution D, itself a parameterized distribution for the $k^{th}$ environment $\varphi_k$, at 910. An environment can represent any set of driving scenarios, such as region, road type, or the like. In one implementation, a sample set of model parameters $w_i$ are obtained for an offline controller F. The offline controller F can be any vehicle controller parameterized by the sample set of model parameters $w_i$. For example, offline controller F can be a model predictive controller parameterized by the sample set of model parameters $w_i$. The offline controller F is a controller that is not controlling operation of a ground vehicle. Instead, the offline controller F can be a controller performing the simulation on the cloud, on a secondary computing platform on the ground vehicle or the like. In one implementation, the parameters can be sampled from a first distribution parameterized for a local environment.

At 920, a controller can run a simulation using local environment states $\{S_t^k\}$, $\{S_t^{m,k}, S_t^{s,k}\}$, wherein $S_t^{m,k}$ are the measured states and $S_t^{s,k}$ are the simulates states for t vehicles in k environments. The measured state can be static states, and the simulated states can represent dynamic states, such as lead vehicle states. In one implementation, the simulation can be run on an offline controller 1010 parameterized for the set of sampled parameters 1020 using a vehicle model 1030 and a sequence of states 1040 of a local environment, in a second loop within the first loop. At 930, state temporal sequences $y_t$ generated by the ground vehicle model in the simulated environment can be collected. At 940, a resulting loss function can be computed for the simulations 1050. At 950, a determination of whether a stopping criterion has been satisfied or not. The stopping criterion can be a predetermined number of repetitions of the processes at 920-940, observation of a minimum change in the computed loss, or the like. If the stopping criterion has not been satisfied, the processes at 920-950 can be repeated. If the stopping criterion has been satisfied, the model parameters associated with the lowest loss w* can be selected 960, at 960. At 970, parameter of an online controller can be set to the model parameters with the lowest loss w*. The online controller can be a controller that is controlling operation of a ground vehicle in a driving environment. The online controller can, for example, be a model predictive controller that generates command and the model parameters with the lowest loss w*. At 980, the online controller can be trained in a vehicle environment 1070 using the model parameters with the lowest loss w* 1080.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A ground vehicle control system comprising:
    a plurality of sensors configured to detect environment information and vehicle operating information;
    one or more predictive controllers utilizing linearization of one or more non-linear vehicle dynamics configured to;
        self-train for an energy consumption solution based on one or more control parameters including the environment information and the vehicle operating information, wherein the environment information includes one or more of current roadway topography, future roadway topography, traffic information, and traffic control device state and the vehicle operating information includes one or more of fuel map and vehicle mass; and
        generate one or more control signals based on the energy consumption solution for output in a vehicle control mode selected from the group consisting of an active control mode, an assist control mode, a coaching control mode, and a passive control mode.

2. The ground vehicle control system of claim 1, wherein the one or more predictive controllers are configured to optimize energy consumption based on:
    segmenting one or more maps including creating tags of driving speeds for road segments;
    controlling a speed of the ground vehicle within a speed window using one or more of road preview information and environment information;
    scheduling shifting using one or more of the road preview information and the environment information;
    planning an acceleration/deceleration profile in one or more of a traffic situation and a non-traffic situation using one or more of the road preview information and the environment information;
    applying torque based on a speed-torque efficiency profile of the ground vehicle; and
    determining a braking plan using one or more of road preview information and environment information.

3. The ground vehicle control system of claim 2, wherein:
    the one or more controllers are further configured to optimize energy consumption based on a lead vehicle model.

4. The ground vehicle control system of claim 3, wherein the lead vehicle model is based on one or more of a predicted future acceleration of one or more lead vehicles, a velocity of the one or more lead vehicles, a position of the one or more lead vehicles and a receding horizon control strategy.

5. The ground vehicle control system of claim 2, further comprising one or more backup controllers, wherein control of the ground vehicle switches to control by the one or more backup controllers when energy consumption optimization is not feasible, convergence issue, in the event accurate mass or other parameters are not available or accurate, or in high deceleration required events.

6. The ground vehicle control system of claim 5, wherein control of the ground vehicle switches back from one or more backup controllers when the one or more controllers can converge to energy consumption optimization within a prescribed iteration limit, the one or more controllers calculate a satisfactory control signal and the backup controller has been operating for a predetermined amount of time.

7. The ground vehicle control system of claim 5, wherein the one or more backup controllers are configured to:
    compensate for disturbances and plant uncertainties in the linear system; and
    linear quadratic reference tracking speed and relative distance while minimizing instantaneous fuel consumption.

8. The ground vehicle control system of claim 2, wherein the one or more predictive controllers are further configured to;
    determine one or more driving scenarios of the one or more surrounding vehicles based on the one or more driving environment parameters;

tune one or more driver control inputs and one or more ground vehicle operating parameters based on the one or more driving scenarios; and generate one or more control signals based on the one or more tuned driver control inputs and one or more tuned ground vehicle operating parameters for output in a vehicle control mode selected from the group consisting of an active control mode, an assist control mode, a coaching control mode, and a passive control mode.

9. The ground vehicle control system of claim 8, wherein the one or more predictive controllers are further configured to:

determine a target speed window based on one or more of one or more ground vehicle operating parameters and one or more driving environment parameters; and determine a target vehicle performance plan based on the target speed window and one or more of the one or more ground vehicle operating parameters, the driver control inputs and the one or more driving environment parameters including the at least one predicted driving environment parameter to reduce one or more of energy consumption and vehicle retardation by a ground vehicle.

10. The ground vehicle control system of claim 9, wherein the one or more predictive controllers are further configured to:

compare the target vehicle performance plan to the one or more driving scenarios of the one or more surrounding vehicles;

classify one or more surrounding vehicles based on differences between the target vehicle performance plan and the one or more driving scenarios of the one or more surrounding vehicles; and tune the one or more driver control inputs and the one or more ground vehicle operating parameters based on the one or more driving scenarios.

11. The ground vehicle control system of claim 10, wherein machine learning is used to classify the surrounding vehicles as good or bad based on the one or more driving scenarios of the one or more surrounding vehicles.

12. The ground vehicle control system of claim 10, wherein the one or more controllers configured to compare the target vehicle performance plan to the one or more driving scenarios of the one or more surrounding vehicles includes the one or more controller further configured to:

initially compare the acceleration/deceleration profile plan to a velocity and an acceleration of the one or more surrounding vehicles to initially determine a good or bad categorization for each of the one or more surrounding vehicles; and further compare operating parameters, driver control inputs, and one or more driving environment parameters for the host vehicle to the velocity, acceleration, distance, type of vehicle signal light activation, current lane, and past behavior of the one or more surrounding vehicles to determine the good or bad categorization of each of the one or more surrounding vehicles.

13. The ground vehicle control system of claim 1, wherein the one or more controllers comprise one or more model predictive controllers.

14. The ground vehicle control system of claim 13, wherein the one or more model predictive controllers are configured to control one or more of vehicle torque, vehicle gear, vehicle retardation, vehicle speed, vehicle acceleration, and vehicle fuel consumption to minimize fuel consumption.

15. The ground vehicle control system of claim 13, wherein the one or more model predictive controllers are configured to optimize energy consumption based on a cost function for one or more decision variables that include engine torque, axle torque, retardation torque, vehicle speed, and distance traveled, subject to a vehicle dynamics for a prediction horizon, and one or more of soft constraints and hard constraints, time varying and non-time varying.

16. The ground vehicle control system of claim 15, wherein the optimization problem is solved by iteratively finding a search direction and a step size, where the search direction is found by simultaneously solving a set of linear equations that include a positive definite block diagonal matrix and a tridiagonal matrix.

17. The ground vehicle control system of claim 1, wherein the one or more model predictive controllers includes:

a vehicle trajectory planning controller coupled to one or more external sensor, one or more external data sources and one or more ground vehicle sensors;

a vehicle dynamic controller coupled to the vehicle trajectory planning controller;

a vehicle stability and wheel dynamic controller coupled to one or more ground vehicle sensors, and an actuator controller coupled to the vehicle dynamic controller, the vehicle stability and wheel dynamic controller and one or more ground vehicle sensors.

18. The ground vehicle control system of claim 17, wherein the one or more model predictive controllers prioritize inputs to a plurality of actuators of the ground vehicle based on one or more of priorities, constraints and preview information.

19. The ground vehicle control system of claim 1, wherein the one or more controllers configured to optimize energy consumption includes:

a linear generalized predictive controller; and successive linearization to linearize the system at sample instants to result in a quadratic programming problem, a result of the quadratic programming problem is used as control inputs for a control horizon.

20. A method comprising:

running in a Monte Carlo loop, sampling a set of parameters from a distribution parameterized for a local environment;

running in a simulation loop within the Monte Carlo loop, performing simulations by an offline controller parameterized for the set of sampled parameters using a vehicle model and a sequence of states of the local environment;

running in the simulation loop, determining samples of losses for the simulations using the vehicle model and the sequence of states of the local environment until a stopping criterion is satisfied;

running in the Monte Carlo loop, selecting a set of given control parameters that yield a predetermined loss after the stopping criterion is satisfied; and setting control parameters of an online controller based on the set of given control parameters that yield the predetermined loss, wherein the online controller includes one or more predictive controllers utilizing linearization of one or more non-linear vehicle dynamics.

21. The method according to claim 20, wherein the predetermined loss comprises a minimum loss.

22. The method according to claim 20, wherein the states of the local environments are based on a plurality of ground vehicles operating in the local environment.

23. The method according to claim 20, wherein
the offline controller does not control a ground vehicle; and
the online controller does control the ground vehicle.

24. The method according to claim 20, wherein the offline controller comprises a model predictive controller parameterized by the set of sampled model parameters.

25. The method according to claim 20, wherein the sequence of state of the local environment comprise a temporal sequence of states generated by vehicles in the local environment.

26. The method according to claim 20, wherein the samples of losses are determined from a loss function for the simulation.

* * * * *